(12) United States Patent
Sung et al.

(10) Patent No.: US 11,861,144 B2
(45) Date of Patent: Jan. 2, 2024

(54) ELECTRONIC SHELF LABEL CONTROLLING METHOD

(71) Applicant: RAINUS CO., LTD., Seongnam-si (KR)

(72) Inventors: Jong Woo Sung, Seongnam-si (KR); Hyun-Hak Kim, Seongnam-si (KR)

(73) Assignee: RAINUS CO., LTD., Seongnam-si (KR)

( * ) Notice: Subject to any disclaimer, the term of this patent is extended or adjusted under 35 U.S.C. 154(b) by 0 days.

(21) Appl. No.: 17/781,788

(22) PCT Filed: Sep. 25, 2020

(86) PCT No.: PCT/KR2020/013046
§ 371 (c)(1),
(2) Date: Jun. 2, 2022

(87) PCT Pub. No.: WO2021/235612
PCT Pub. Date: Nov. 25, 2021

(65) Prior Publication Data
US 2023/0022179 A1  Jan. 26, 2023

(30) Foreign Application Priority Data
May 21, 2020 (KR) .................. 10-2020-0061083

(51) Int. Cl.
*G09F 3/20* (2006.01)
*G06F 3/0482* (2013.01)
*G06Q 30/0601* (2023.01)

(52) U.S. Cl.
CPC ....... *G06F 3/0482* (2013.01); *G06Q 30/0641* (2013.01); *G09F 3/208* (2013.01)

(58) Field of Classification Search
CPC ... G06F 3/0482; G06F 3/147; G06Q 30/0641; G06Q 10/08; G06Q 30/06; G06Q 10/087;
(Continued)

(56) References Cited

U.S. PATENT DOCUMENTS 7,792,711 B2   9/2010  Swafford, Jr. et al.
8,698,606 B2   4/2014  Choi et al.
(Continued)

FOREIGN PATENT DOCUMENTS

EP   2 728 539 A1    5/2014
JP   2009-172274 A   8/2009
(Continued)

OTHER PUBLICATIONS

International Search Report dated Feb. 17, 2021, in connection with International Patent Application No. PCT/KR2020/013046, along with an English translation.
(Continued)

*Primary Examiner* — Hien L Duong
(74) *Attorney, Agent, or Firm* — Hauptman Ham, LLP (57) ABSTRACT

A method for controlling an electronic shelf label according to an embodiment of the present disclosure includes providing an input request window including a barcode recognition request phrase on a virtual cell selected by a user, receiving barcode information of a product obtained by a barcode reader as a product identification input, obtaining product information based on the received product identification input, and displaying the obtained product information on the selected virtual cell.

7 Claims, 7 Drawing Sheets

(58) Field of Classification Search
CPC ......... G09F 3/208; G09F 3/204; G06K 19/06;
G06K 19/06009
See application file for complete search history.

(56) References Cited

U.S. PATENT DOCUMENTS

| | | | |
|---|---|---|---|
| 8,812,378 B2 | 8/2014 | Swafford, Jr. et al. | |
| 8,938,396 B2 | 1/2015 | Swafford, Jr. et al. | |
| 9,805,539 B2 | 10/2017 | Swafford, Jr. et al. | |
| 9,818,148 B2 | 11/2017 | Bynum et al. | |
| 9,898,712 B2 | 2/2018 | Johnson et al. | |
| 10,116,861 B1* | 10/2018 | Graham | H04N 23/631 |
| 10,210,478 B2 | 2/2019 | Johnson et al. | |
| 10,339,495 B2 | 7/2019 | Swafford et al. | |
| 10,357,118 B2 | 7/2019 | Swafford | |
| 10,410,277 B2 | 9/2019 | Bynum et al. | |
| 10,535,216 B2 | 1/2020 | Swafford, Jr. et al. | |
| 2005/0168345 A1 | 8/2005 | Swafford, Jr. et al. | |
| 2005/0177463 A1* | 8/2005 | Crutchfield, Jr. | G06Q 30/06 705/27.2 |
| 2008/0149658 A1* | 6/2008 | Hudis | G07F 9/02 221/1 |
| 2011/0053517 A1* | 3/2011 | Wright | G06F 3/147 455/67.13 |
| 2011/0055103 A1 | 3/2011 | Swafford, Jr. et al. | |
| 2011/0102155 A1 | 5/2011 | Choi et al. | |
| 2011/0282768 A1 | 11/2011 | Swafford, Jr. et al. | |
| 2013/0226742 A1* | 8/2013 | Johnson | G06Q 30/02 705/27.1 |
| 2013/0313317 A1* | 11/2013 | Waters | G06Q 10/08 235/487 |
| 2014/0258028 A1 | 9/2014 | Bynum et al. | |
| 2014/0299620 A1 | 10/2014 | Swafford, Jr. et al. | |
| 2015/0112823 A1* | 4/2015 | Kobayashi | G06Q 20/202 705/21 |
| 2016/0132822 A1 | 5/2016 | Swafford | |
| 2016/0132823 A1 | 5/2016 | Swafford et al. | |
| 2016/0134930 A1 | 5/2016 | Swafford | |
| 2017/0293959 A1* | 10/2017 | Itou | G06Q 30/0623 |
| 2018/0047243 A1 | 2/2018 | Swafford, Jr. et al. | |
| 2018/0068379 A1 | 3/2018 | Bynum et al. | |
| 2018/0189727 A1 | 7/2018 | Johnson et al. | |
| 2019/0019140 A1 | 1/2019 | Costello et al. | |
| 2019/0197561 A1* | 6/2019 | Adato | G06T 7/73 |
| 2019/0220805 A1 | 7/2019 | Johnson et al. | |
| 2019/0272498 A1 | 9/2019 | Swafford | |
| 2019/0279149 A1 | 9/2019 | Swafford | |
| 2019/0282000 A1 | 9/2019 | Swafford | |
| 2020/0043083 A1 | 2/2020 | Bynum et al. | |
| 2020/0065753 A1 | 2/2020 | Costello et al. | |
| 2020/0065754 A1 | 2/2020 | Costello et al. | |
| 2020/0065755 A1 | 2/2020 | Costello et al. | |
| 2020/0066084 A1 | 2/2020 | Swafford, Jr. et al. | |
| 2021/0004756 A1* | 1/2021 | Kulkarni Wadhonkar | G06V 20/52 |
| 2021/0304256 A1* | 9/2021 | Ishida | G07F 9/026 |
| 2022/0292445 A1* | 9/2022 | Nakajima | G06Q 30/06 |

FOREIGN PATENT DOCUMENTS

| | | |
|---|---|---|
| KR | 10-2011-0051076 A | 5/2011 |
| KR | 10-2014-0056797 A | 5/2014 |
| KR | 10-2016-0051455 A | 5/2016 |
| KR | 10-2018-0061420 A | 6/2018 |

OTHER PUBLICATIONS

Written Opinion dated Feb. 17, 2021, in connection with International Patent Application No. PCT/KR2020/013046.

* cited by examiner

FIG. 10

ELECTRONIC SHELF LABEL CONTROLLING METHOD

CROSS-REFERENCE TO RELATED APPLICATIONS

The present application is a national stage filing under 35 U.S.C § 371 of PCT application number PCT/KR2020/013046 filed on Sep. 25, 2020, which is based upon and claims the benefit of priorities to Korean Patent Application No. 10-2020-0061083, filed on May 21, 2020, in the Korean Intellectual Property Office, which are incorporated herein in their entireties by reference.

TECHNICAL FIELD

The present disclosure relates to a method for controlling an electronic shelf label, and more particularly, to a method for controlling an electronic shelf label that may set product information displayed on the electronic shelf label using various methods.

BACKGROUND ART

A large number of products on sale are displayed on a display stand in stores such as large marts. A label of recording product information such as product name, product price, and product shelf-life is attached to the display stand, and customers may identify the product information by checking the label.

The displayed products are sold within a short time period in stores where products are quickly distributed, so the product information displayed on the label may be frequently changed. Therefore, an electronic shelf label (ESL) is widely used in stores to easily change the product information displayed on the label and to repeatedly use.

The ESL receives and displays various pieces of product information including price information. The ESL is a substitute for other paper labels and may display product information.

Figure 1:
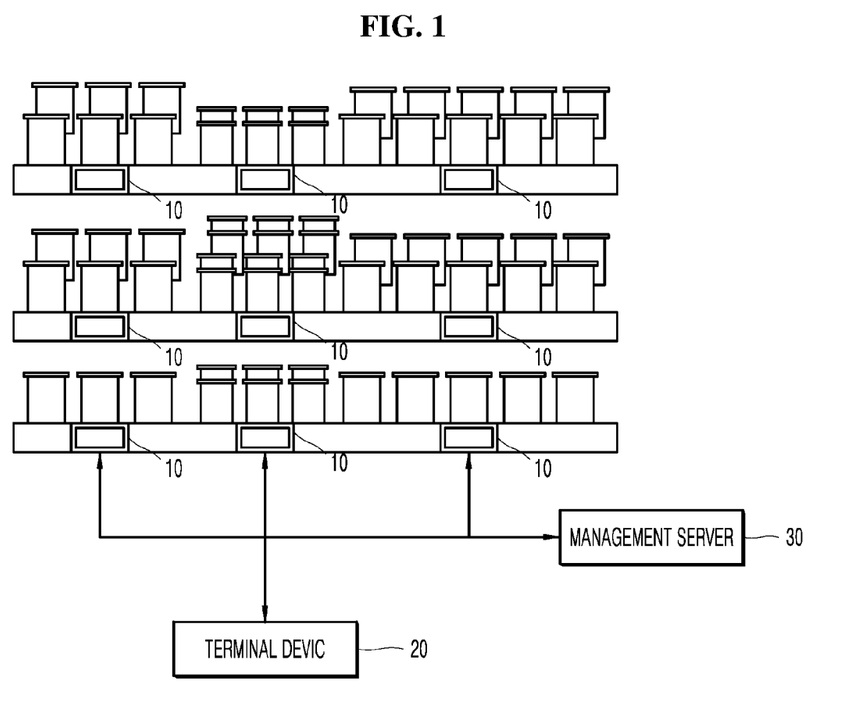
FIG. 1 shows a conventional electronic shelf label used to display product information of product displayed on a display stand of a store.

FIG. 1 shows a conventional ESL used to display product information on product displayed on a display stand of a store.

Referring to FIG. 1, it may be seen that a plurality of ESLs 10 are used to display product information on a plurality of products displayed on the display stand. In order to display the product information on the ESL 10 as described above, a store manager may place the ESL 10 according to the position of the product displayed on the display stand and map the individual ESL 10 to the displayed product using a terminal device 20 such as a PDA. Specifically, a process of storing mapping information in a management server 30 by reading the unique number of the ESL 10 and an identification code of the product to be mapped by the terminal device 20 using means such as a barcode or NFC is performed. Subsequently, the ESL 10 receives the information on the mapped product from the management server 30 and displays the product information.

The manager has to map the individual ESL 10 to the product while carrying the terminal device 20 to display the product information using the ESL 10 as described above. If an abnormality occurs in the terminal device 20, there is a problem in that product information to be displayed on the ESL 10 may not be set.

DISCLOSURE

Technical Problem

The present disclosure provides a method for controlling an electronic shelf label that may set displayed product information by a manager without an additional terminal device.

The present disclosure also provides a method for controlling an electronic shelf label that may set product information using various methods by the manager.

The objects of the present disclosure are not limited to the above-mentioned objects, and other objects and advantages of the present disclosure that are not mentioned may be understood by the following description, and will be more clearly understood by embodiments of the present disclosure. In addition, it will be easily understood that the objects and advantages of the present disclosure may be realized by features described in claims and a combination thereof.

Technical Solution

According to an embodiment of the present disclosure, a method for controlling an electronic shelf label include: providing an input request window including a barcode recognition request phrase to a virtual cell selected by a user; receiving barcode information of a product obtained by a barcode reader as a product identification input; obtaining product information based on the received product identification input; and displaying the obtained product information on the selected virtual cell.

In addition, according to an embodiment of the present disclosure, the method further include: after providing the input request window including the barcode recognition request phrase, based on receiving an input method selection input from the user, providing an input method list including a plurality of input methods to the selected virtual cell; providing the input request window based on an input method selected by the user among the plurality of input methods; and receiving the product identification input based on the selected input method from the user.

In addition, according to an embodiment of the present disclosure, for the method, the plurality of input methods include a product identification code input method, a product list selection method, a product picture input method, and a voice input method.

In addition, according to an embodiment of the present disclosure, for the method, providing the input request window based on the selected input method includes providing the input request window including a virtual keypad if the selected input method is the product identification code input method and receiving the product identification input based on the selected input method includes receiving the product identification code from the user using the virtual keypad.

In addition, according to an embodiment of the present disclosure, for the method, providing the input request window based on the selected input method includes providing the input request window including the product list if the selected input method is the product list selection method and receiving the product identification input based on the selected input method includes receiving an input of selecting any one of the products included in the product list from the user.

In addition, according to an embodiment of the present disclosure, for the method, providing the input request window based on the selected input method includes providing the input request window including a product recognition request phrase if the selected input method is the product picture input method and receiving the product identification input based on the selected input method includes receiving product picture information obtained by a camera.

In addition, according to an embodiment of the present disclosure, for the method, providing the input request window based on the selected input method includes providing the input request window including a voice input request phrase if the selected input method is the voice input method and receiving the product identification input based on the selected input method includes receiving the voice input having a product identification code or the product name at a microphone.

In addition, according to an embodiment of the present disclosure, for the method, obtaining the product information includes: transmitting the received product identification input to a management server; and receiving the product information based on the product identification input from the management server.

Advantageous Effects

A method for controlling an electronic shelf label according to the present disclosure is used to set displayed product information by a manager without an additional terminal device.

In addition, the method for controlling the electronic shelf label according to the present disclosure may be used to set product information using various methods by the manager.

In addition to the above-described effects, further effects of the present disclosure are described together with explanations of specific matters to implement the present disclosure.

BEST MODE

The above-mentioned objects, features, and advantages of the present disclosure are described in detail with reference to accompanying drawings. Therefore, the skilled person in the art to which the present disclosure pertains may easily embody the technical idea of the present disclosure. In the description of the present disclosure, a detailed description of a well-known technology relating to the present disclosure may be omitted if it unnecessarily obscures the gist of the present disclosure. Hereinafter, preferred embodiments of the present disclosure are described in detail with reference to the accompanying drawings. In the drawings, same reference numerals are used to refer to same or similar components.

Terms such as first, second, and the like may be used herein to describe various elements of the present disclosure. These elements are not limited by these terms. These terms are intended to distinguish one element from another element. A first element may be a second element unless otherwise stated.

Further, the terms "connected," "coupled," or the like are used such that, where a first component is connected or coupled to a second component, the first component may be directly connected or able to be connected to the second component, or one or more additional components may be disposed between the first and second components, or the first and second components may be connected or coupled through one or more additional components.

Singular expressions used in the present disclosure include plural expressions unless the context clearly indicates otherwise. In the present disclosure, terms such as "including" or "comprising" should not be construed as necessarily including all of the various components, or various steps described in the present disclosure, and terms such as "including" or "comprising" should be construed as not including some elements or some steps or further including additional elements or steps.

Unless otherwise stated, each component may be singular or plural throughout the disclosure.

Hereinafter, a method for controlling an electronic shelf label according to some embodiments of the present disclosure is described.

Hereinafter, a user refers to any person using the electronic shelf label. In addition, a manager refers to a person using the electronic shelf label to manage products sold in a store among users and a consumer refers to a person using the electronic shelf label to obtain product information or purchase products in a store among users.

Figure 2:
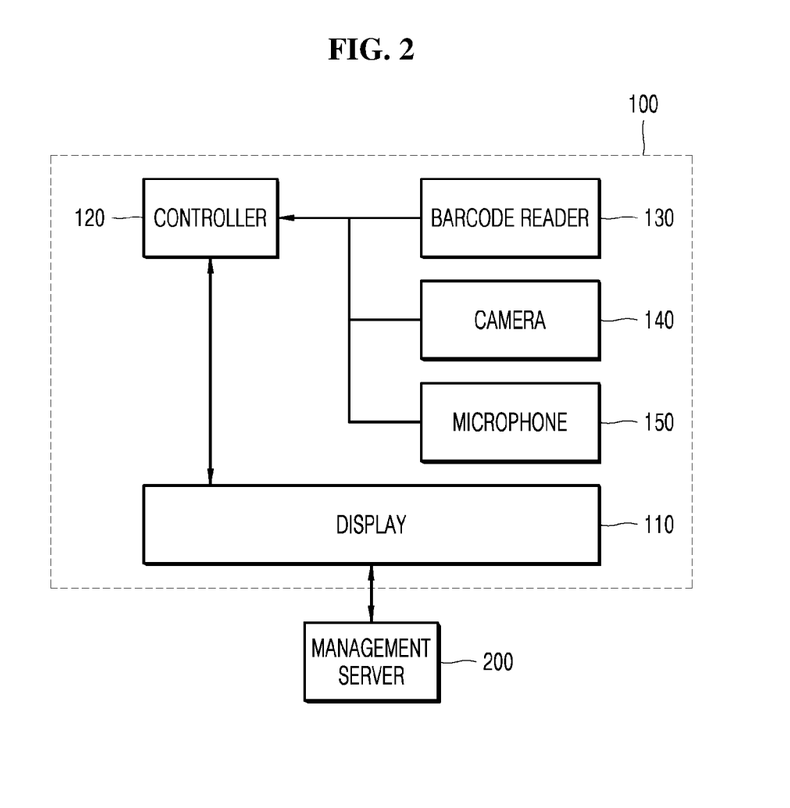
FIG. 2 shows an electronic shelf label that may use a method for controlling the electronic shelf label according to an embodiment of the present disclosure.

FIG. 2 shows an electronic shelf label that may use a method for controlling the electronic shelf label according to an embodiment of the present disclosure.

Referring to FIG. 2, an electronic shelf label 100 that may use the method for controlling the electronic shelf label according to an embodiment of the present disclosure includes a display 110, a controller 120, and a barcode reader 130. In addition, according to an embodiment of the present disclosure, the electronic shelf label 100 that may use the method for controlling the electronic shelf label may further include a camera 140 or a microphone 150.

According to an embodiment of the present disclosure, the electronic shelf label 100 that may use the method for controlling the electronic shelf label may have a bar shape and a horizontal length thereof is longer than a vertical length thereof when the electronic shelf label 100 is coupled to a display stand. With this bar shaped structure of the electronic shelf label 100, an electronic shelf label 100 may display product information on a plurality of products.

The display 110 receives a touch input from a user and displays information to the user on a screen. That is, the display 110 receives the touch input from the user, transmits the touch input to the controller 120, and displays the information to the user according to a command received from the controller 120. The display 110 may display information to the user on one or more virtual cells.

In an embodiment of the present disclosure, the display 110 may be a touch screen capable of displaying information to the user on the screen while receiving the touch input from the user.

The controller 120 controls the screen displayed by the display 110 based on the input received through the display 110. The controller 120 may include a memory to store instructions for controlling the screen displayed by the display 110 based on the input received through the display 110, a processor to process the instructions stored in the memory, and a communication module to communicate with a management server 200 described below.

The controller 120 may control the display 110 to be operated in a consumer mode or a manager mode.

The consumer mode is a mode in which product information is displayed to the consumer. When the electronic shelf label 100 is operated in the consumer mode, the controller 120 may control the display 110 to display a different screen according to the input received through the display 110. In addition, when the electronic shelf label 100 is operated in the consumer mode, the controller 120 may transmit data to the management server 200 described below based on the input received through the display 110.

The manager mode is a mode in which the user may set the screen displayed in the consumer mode. When the electronic shelf label is operated in the manager mode, the user applies the input to the display 110 to divide the screen displayed on the display 110 into virtual cells and match the divided virtual cell to the product.

A method for controlling the electronic shelf label according to an embodiment of the present disclosure described below relates to a method of setting product information displayed on the electronic shelf label using various methods in the manager mode.

The barcode reader 130 recognizes a barcode displayed on a product. The controller 120 may obtain a product identification code based on barcode information received at the barcode reader 130 and control the display 110 to display the product information.

The camera 140 receives product picture information from the user. In this case, the product picture information includes an actual appearance of the product. The controller 120 may obtain the product identification code based on the product picture information received at the camera 140 and control the display 110 display the product information.

The microphone 150 receives a voice input from a user. The controller 120 may obtain a product name or a product identification code based on the voice input received at the microphone 150 and control the display 110 to display product information.

The management server 200 stores product information on products displayed on a display stand of a store. That is, the management server 200 stores a product identification code of each of all products displayed in the store and product information corresponding thereto. In addition, the management server 200 may store various pieces of information necessary for the operation of the electronic shelf label 100.

The management server 200 communicates with the controller 120 of the electronic shelf label 100. The management server 200 may transmit product information to be displayed on the screen of the display 110 of the electronic shelf label 100 and receive product information currently displayed on the electronic shelf label 100.

In addition, the management server 200 may process various calculations based on data received from the electronic shelf label 100.

A more detailed method for controlling the electronic shelf label 100 as described above may be described with reference to FIGS. 3 to 10.

Figure 3:
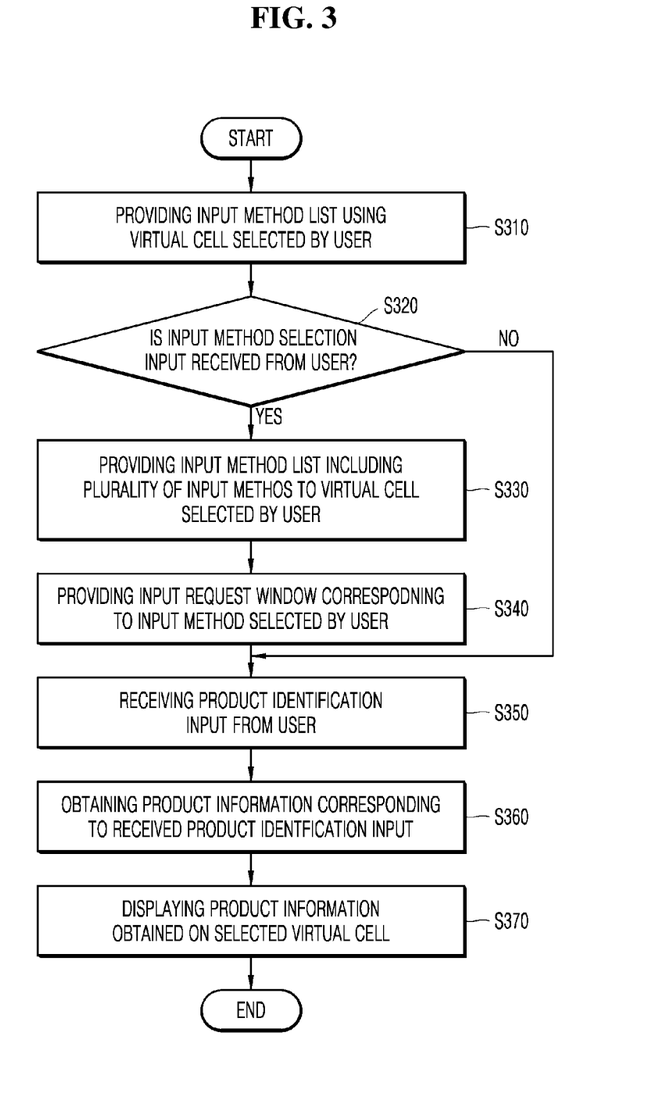
FIG. 3 is a flowchart of a method for controlling an electronic shelf label according to an embodiment of the present disclosure.

FIG. 3 is a flowchart of a method for controlling an electronic shelf label according to an embodiment of the present disclosure.

Referring to FIG. 3, a controller 120 provides an input request window including a barcode recognition request phrase on a virtual cell selected by a user (S310).

In more detail, the user may apply one or more virtual cell selection inputs displayed on the display 110. In this case, the virtual cell selection input may be an input of selecting any one of a plurality of virtual cells displayed on the display 110 and may be set as an input of touching any one of the virtual cells. When the virtual cell selection input is received through the display 110, the controller 120 may provide an input request window including a barcode recognition request phrase to the virtual cell selected based on the virtual cell selection input.

Providing, by the controller 120, the input request window including the barcode recognition request phrase to the virtual cell selected by the user (S310) may be described in more detail with reference to FIG. 4.

Figure 4:
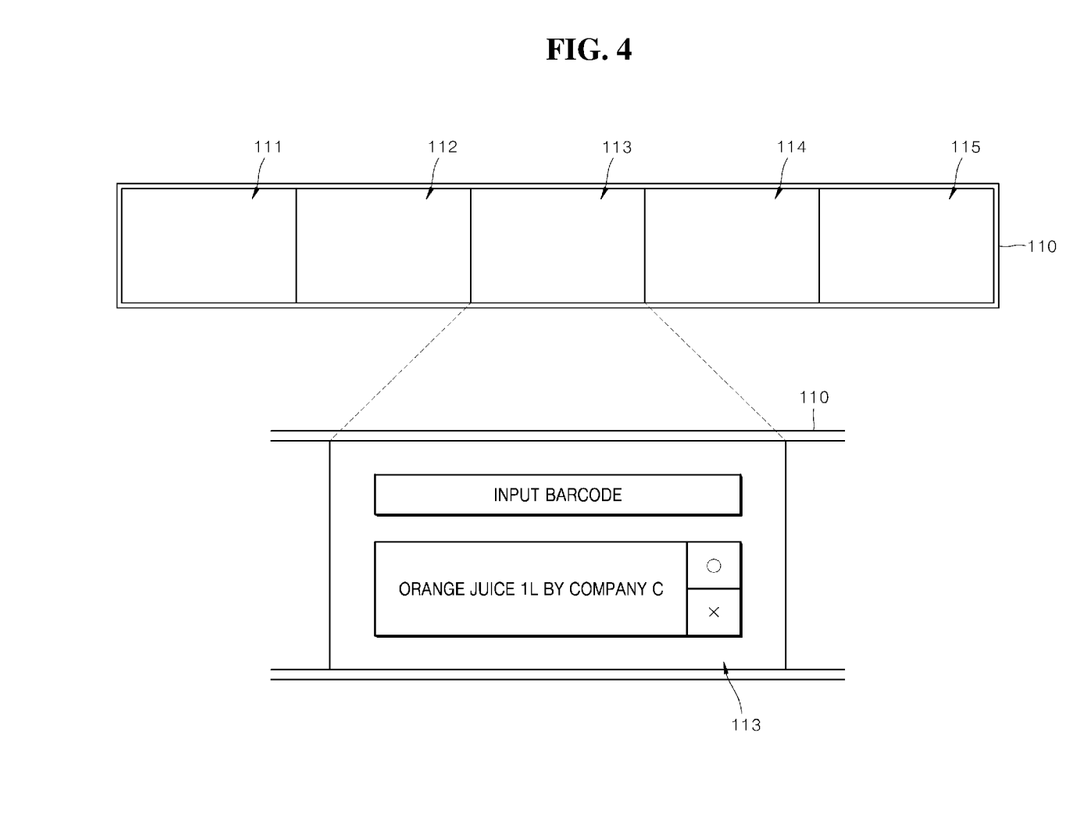
FIG. 4 shows an input request window including a barcode recognition request phase on a virtual cell using a method for controlling an electronic shelf label according to an embodiment of the present disclosure.

FIG. 4 shows an input request window including a barcode recognition request phrase displayed on a virtual cell using a method for controlling an electronic shelf label according to an embodiment of the present disclosure.

Referring to FIG. 4, a display 110 displays a plurality of virtual cells 111, 112, 113, 114, and 115. The user may apply a virtual cell selection input to the electronic shelf label 100 by touching any one of the plurality of virtual cells 111, 112, 113, 114, and 115. Hereinafter, it is assumed that the user applies a virtual cell selection input of selecting a third virtual cell 113 among the plurality of virtual cells 111, 112, 113, 114, and 115.

As the controller 120 receives the virtual cell selection input of selecting the third virtual cell 113, the controller 120 provides an input request window including a barcode recognition request phase to the third virtual cell 113. The user may check the input request window including the barcode recognition request phrase and input barcode information of product to be displayed using a barcode reader 130.

In this case, based on reception of the barcode information of the product, the controller 120 displays the product name corresponding to the barcode information on an input confirmation window located below the barcode recognition request phrase to determine whether the input applied by the user is a correct input.

Referring back to FIG. 3, after the controller 120 provides the input request window including the barcode recognition request phrase as a default value, the controller 120 determines reception or non-reception of an input method selection input from the user (S320).

The input method selection input is an input applied when a user wants to apply a product identification input using a method other than barcode recognition.

Based on the non-reception of the input method selection input, the controller 120 continuously provides an input request window including the barcode recognition request phrase to the virtual cell. The user may check the input request window including the barcode recognition request phrase and input barcode information of the product to be displayed using the barcode reader 130. Subsequently, the controller 120 receives the barcode information of the product obtained by the barcode reader 130 as a product identification input (S350).

In this case, as shown in FIG. 4, the controller 120 displays the product name corresponding to the barcode information on the input confirmation window located below the barcode recognition request phrase to determine whether the input applied by the user is a correct input.

After the controller 120 provides the input request window including the barcode recognition request phrase, based on the reception of the input method selection input from the user, the controller 120 provides an input method list including a plurality of input methods to the selected virtual cell (S330).

The input method refers to a method of inputting a product identification code by the user, and may include a barcode input method, a product identification code input method, a product list selection method, a product picture input method, and a voice input method. In this case, when the barcode input method is set as a default value, the input method list may be a list in which methods other than the barcode input method are listed among the above-described input methods. This configuration may be described in more detail with reference to FIG. 5.

Figure 5:
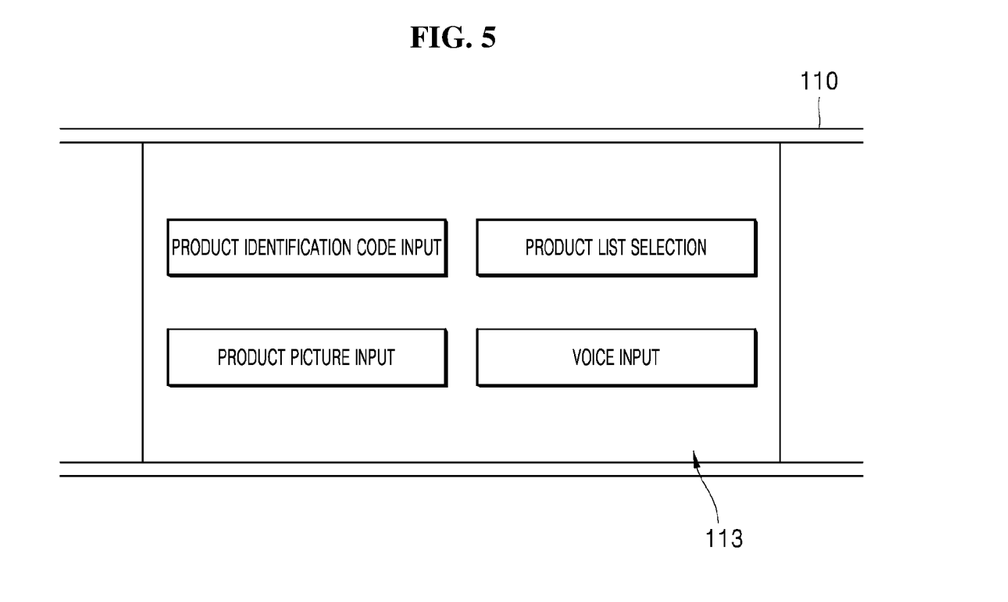
FIG. 5 shows an input method list displayed on a virtual cell using a method for controlling an electronic shelf label according to an embodiment.

FIG. 5 shows an input method list displayed in a virtual cell using a method for controlling an electronic shelf label according to an embodiment.

Referring to FIG. 5, it may be seen that a display 110 displays the input method list on a third virtual cell 113.

In an embodiment of the present disclosure, the input method list includes a product identification code input method, a product list selection method, a product picture input method, and a voice input method. The user may select a desired input method by touching an area in which a desired input method is displayed among the input methods included in the input method list.

Referring back to FIG. 3, after providing the input method list, the controller 120 provides an input request window based on the input method selected by the user among the plurality of input methods on the display 110 (S340). Subsequently, the controller 120 receives the product identification input based on the input method selected by the user through the display 110 (S350).

That is, in an embodiment of the present disclosure, the controller 120 provide an input request window based on the input method selected by the user among the product identification code input method, the product list selection method, the product picture input method, and the voice input method included in the input method list and receives a product identification input corresponding to the input request window through the display 110. The input request window based on each input method and the product identification input may be described in more detail with reference to FIGS. 6 to 9.

Figure 6:
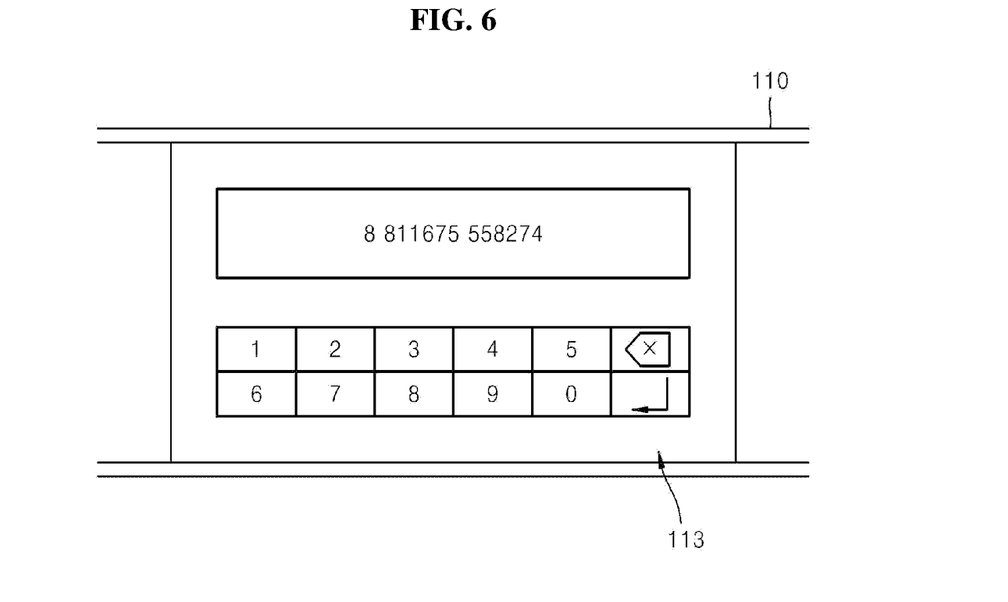
FIG. 6 shows an input request window including a virtual keypad on a virtual cell using a method for controlling an electronic shelf label according to an embodiment of the present disclosure.

FIG. 6 shows an input request window including a virtual keypad displayed on a virtual cell using a method for controlling an electronic shelf label according to an embodiment of the present disclosure.

Referring to FIG. 6, when a user selects a product identification code input method, an embodiment of an input request window displayed on a third virtual cell 113 of a display 110 may be confirmed.

If the selected input method is a product identification code input method, a controller 120 provides an input request window including a virtual keypad. The virtual keypad is a tool that helps the user to input letters, numbers, and the like, and the user may input the letters by touching a specific area of the virtual keypad displayed on the display 110.

The controller 120 provides the virtual keypad on the display 110 in order for the user to input a product identification code. The product identification code may distinguish a specific product from other products and may consist of a combination of letters, numbers, and the like. In one embodiment of the present disclosure, if the product identification code consists of the combination of numbers, the virtual keypad may be a keypad capable of inputting the numbers.

When the controller 120 provides the input request window including the virtual keypad, the controller 120 receives a product identification code as a product identification input from the user, which is input using the virtual keypad. In this case, the controller 120 may display the product identification code input by the user on an input confirmation window located above the virtual keypad and determine whether the input applied by the user is a correct input.

Figure 7:
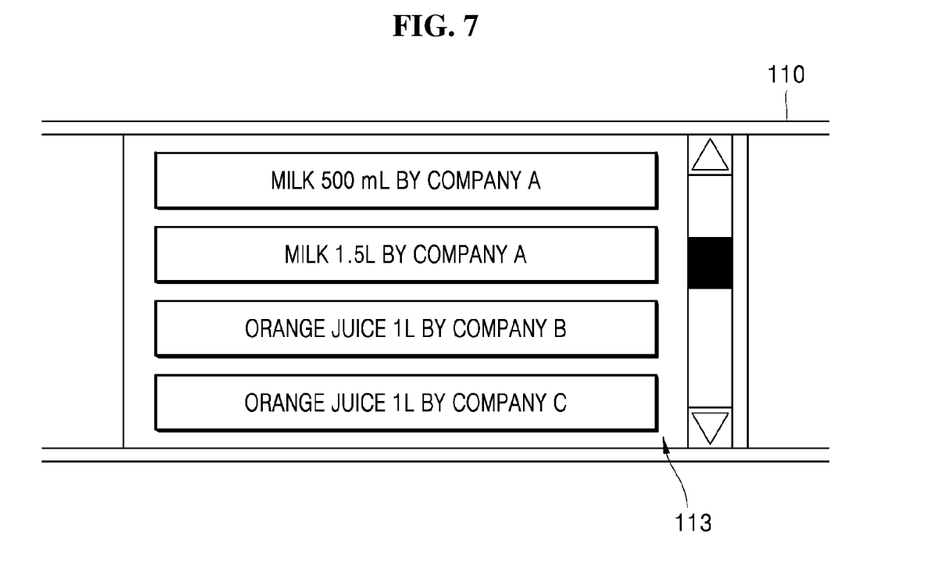
FIG. 7 shows an input request window including a product list on a virtual cell displayed using a method for controlling an electronic label shelf according to an embodiment of the present disclosure.

FIG. 7 shows an input request window including a product list displayed on a virtual cell using a method for controlling an electronic shelf label according to an embodiment of the present disclosure.

Referring to FIG. 7, when a user selects a product list selection method, an embodiment of the input request window displayed on a third virtual cell 113 of a display 110 may be confirmed.

If the selected input method is a product list selection method, a controller 120 provides an input request window including a product list. The product list includes all products that may be displayed on a display stand of a store. After the user finds a desired product in the product list displayed on the display 110, the user may apply an input of selecting one of the products included in the product list by touching an area where the corresponding product is displayed. In this case, if the selected input method is the product list selection method, an input of selecting any one of the products included in the product list is a product identification input.

In other words, the controller 120 provides the product list on the display 110 in order for the user to apply the product identification input. In addition, when the controller 120 provides the input request window including the product list, the controller 120 receives an input of selecting any one of the products included in the product list from the user.

Figure 8:
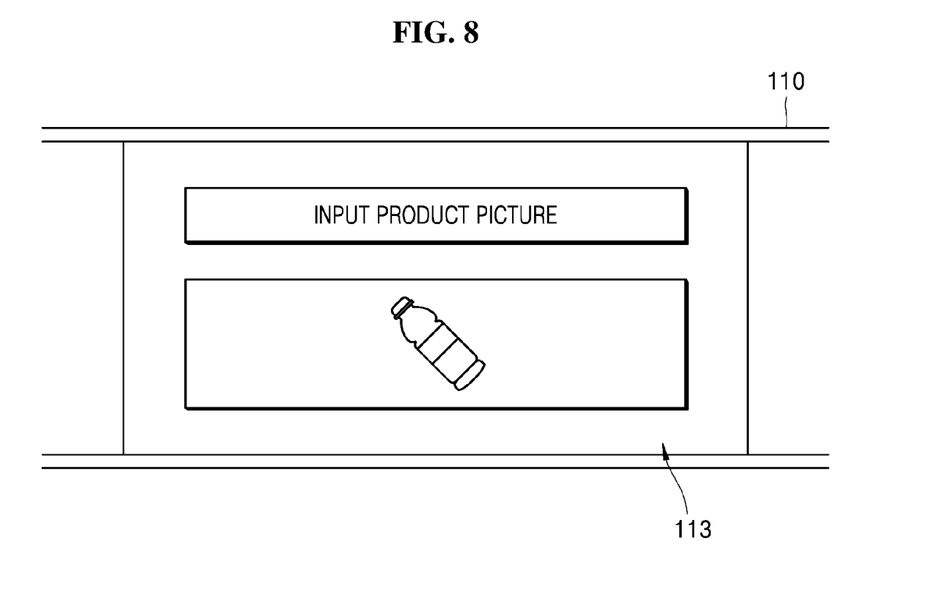
FIG. 8 shows an input request window including a product recognition request phrase displayed on a virtual cell using a method for controlling an electronic shelf label according to an embodiment of the present disclosure.

FIG. 8 shows an input request window including a product recognition request phrase displayed on a virtual cell using a method for controlling an electronic shelf label according to an embodiment of the present disclosure.

Referring to FIG. 8, when a user selects a product picture input method, an embodiment of the input request window displayed on a third virtual cell 113 of a display 110 may be confirmed.

If the selected input method is the product picture input method, a controller 120 provides an input request window including a product recognition request phrase. The user may check the input request window including the product recognition request phrase and input an actual appearance of the product to be displayed using a camera 140. In addition, the controller 120 receives product picture information obtained by the camera 140.

In this case, the controller 120 may display a product picture on the input confirmation window located below the product recognition request phrase to determine whether the input applied by the user is a correct input.

Figure 9:
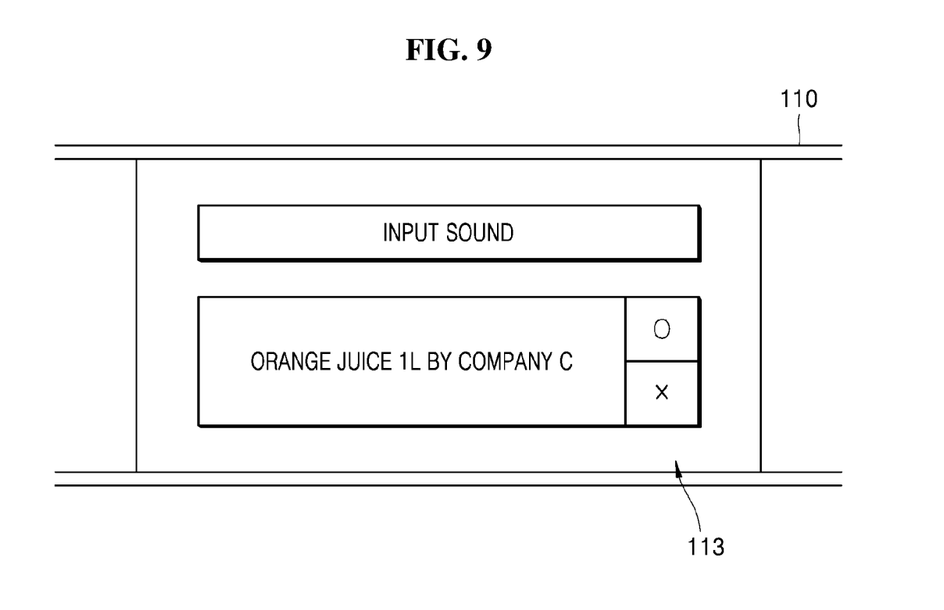
FIG. 9 shows an input request window including a voice input request phrase displayed on a virtual cell using a method for controlling an electronic shelf label according to an embodiment of the present disclosure.

FIG. 9 shows an input request window including a voice input request phrase displayed on a virtual cell using a method for controlling an electronic shelf label according to an embodiment of the present disclosure.

Referring to FIG. 9, when a user selects a voice input method, an embodiment of the input request window displayed on a third virtual cell 113 of a display 110 may be confirmed.

If the selected input method is the voice input method, a controller 120 provides the input request window including the voice input request phrase. The user may check the input request window including the voice input request phrase and input an identification code or the name of the product to be displayed to a microphone 150. In addition, the controller 120 receives the voice input including the product identification code or the product name obtained by the microphone 150.

In this case, the controller 120 may display the product identification code or the product name included in the voice input on the input confirmation window located below the voice input request phrase to determine whether the input applied by the user is a correct input.

As described with reference to FIGS. 5 to 9, an administrator may set displayed product information even without an additional terminal device using various methods for controlling the electronic shelf label according to the present disclosure and may set the product information using the various methods.

Referring back to FIG. 3, after receiving the product identification input, the controller 120 obtains product information based on the received product identification input (S360).

The product information may include information on the product name, product price, the manufactured date of the product, and a related product to a product.

In an embodiment of the present disclosure, the product information based on the product identification input may be stored in the management server 200. In this case, the controller 120 transmits a product identification input to the management server 200 to receive product information from the management server 200. Then, the controller 120 receives the product information based on the product identification input from the management server 200. That is, the controller 120 may obtain the product information from the management server 200.

In another embodiment of the present disclosure, the product information based on the product identification code may be stored in a memory of the controller 120. In this case, the controller 120 may obtain product information by searching the memory without communication with the management server 200.

After obtaining the product information, the controller 120 displays the obtained product information on the selected virtual cell 113 (S370). An embodiment in which product information is displayed on the selected virtual cell 113 may be confirmed in FIG. 10.

Figure 10:
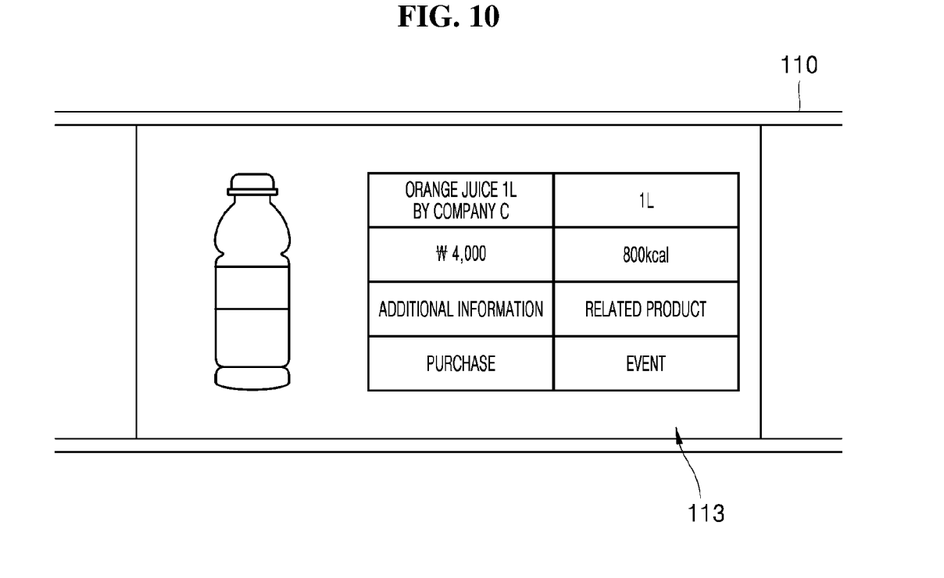
FIG. 10 shows product information displayed on a virtual cell using a method for controlling an electronic shelf label according to an embodiment of the present disclosure.

FIG. 10 shows product information displayed on a virtual cell using a method for controlling an electronic shelf label according to an embodiment of the present disclosure.

Referring to FIG. 10, it may be seen that a picture of a pet bottle-shaped product is displayed on the left side of a selected virtual cell 113 and product information such as the product name of 'orange juice by company B" and the price of ₩4,000 is displayed in the right table. The product picture, the product name, the product volume, the price, and the product calorie are displayed in the selected virtual cell 113 as the product information in an embodiment of FIG. 10, but the present disclosure is not limited thereto and other pieces of information may be displayed as the product information. In addition, it may be seen that menus that consumers may select such as additional information, related product, purchase, and event are additionally displayed in the table on the right side of the selected virtual cell 113 of FIG. 10. When the electronic shelf label 100 is operated in the consumer mode, the electronic shelf label 100 may perform other operations based on reception of an input of touching additional information, related product, purchase, and event from the user.

As described above, an administrator may set displayed product information by various methods even without the additional terminal device using the method for controlling the electronic shelf label according to the present disclosure.

The present disclosure has been described as described above with reference to exemplary drawings, but the present disclosure is not limited to the embodiments and drawings disclosed herein, and various modifications can be made by those skilled in the art within the scope of the technical idea of the present disclosure. Further, even if working effects obtained based on configurations of the present disclosure are not explicitly described in the description of embodiments of the present disclosure, effects predictable based on the corresponding configuration have to be recognized.

The invention claimed is:

1. A method for controlling an electronic shelf label, comprising:
    providing an input request window comprising a barcode recognition request phrase to a virtual cell selected by a user;
    receiving barcode information of a product obtained by a barcode reader as a product identification input;
    obtaining product information based on the received product identification input; and
    displaying the obtained product information on the selected virtual cell,
    wherein providing the input request window comprises:
        after providing the input request window, when an input method is selected to input a product identification input through a method other than barcode recognition, providing a plurality of input methods to the selected virtual cell, and
    wherein the plurality of input methods comprise a product identification code input method, a product list selection method, a product picture input method, and a voice input method.

2. The method of claim 1, further comprising:
    providing the input request window based on an input method selected by the user among the plurality of input methods; and receiving the product identification input based on the selected input method from the user.

3. The method of claim 2,
wherein providing the input request window based on the selected input method comprises providing the input request window comprising a virtual keypad if the selected input method is the product identification code input method and
wherein receiving the product identification input based on the selected input method comprises receiving the product identification code from the user using the virtual keypad.

4. The method of claim 2,
wherein providing the input request window based on the selected input method comprises providing the input request window comprising the product list if the selected input method is the product list selection method and
wherein receiving the product identification input based on the selected input method comprises receiving an input of selecting any one of the products comprised in the product list from the user.

5. The method of claim 2,
wherein providing the input request window based on the selected input method comprises providing the input request window comprising a product recognition request phrase if the selected input method is the product picture input method and
wherein receiving the product identification input based on the selected input method comprises receiving product picture information obtained by a camera.

6. The method of claim 2,
wherein providing the input request window based on the selected input method comprises providing the input request window comprising a voice input request phrase if the selected input method is the voice input method and
wherein receiving the product identification input based on the selected input method comprises receiving the voice input having a product identification code or the product name at a microphone.

7. The method of claim 1, wherein obtaining the product information comprises:
transmitting the received product identification input to a management server; and
receiving the product information based on the product identification input from the management server.

\* \* \* \* \*